(12) United States Patent
Faldysta et al.

(10) Patent No.: US 9,273,190 B2
(45) Date of Patent: Mar. 1, 2016

(54) ROLL-UP POLYESTER FILM COMPRISING, ON AT LEAST ONE OF THE FACES THEREOF, A SCRATCH-RESISTANT CROSS-LINKED COATING, METHOD FOR OBTAINING THIS POLYESTER FILM

(75) Inventors: Julien Faldysta, Villeurbanne (FR); Lucile Gambut-Garel, Lyons (FR); Isabelle Juillard, Saint Genis les Ollères (FR)

(73) Assignee: TORAY FILMS EUROPE, Saint-Maurice-de-Beynost (FR)

( * ) Notice: Subject to any disclaimer, the term of this patent is extended or adjusted under 35 U.S.C. 154(b) by 661 days.

(21) Appl. No.: 12/810,700

(22) PCT Filed: Dec. 23, 2008

(86) PCT No.: PCT/EP2008/068228
§ 371 (c)(1),
(2), (4) Date: Jan. 6, 2011

(87) PCT Pub. No.: WO2009/083552
PCT Pub. Date: Jul. 9, 2009

(65) Prior Publication Data
US 2011/0097574 A1    Apr. 28, 2011

(30) Foreign Application Priority Data

Dec. 26, 2007  (FR) .................................... 07 60356

(51) Int. Cl.
*B32B 7/02* (2006.01)
*B32B 15/09* (2006.01)
*B32B 27/30* (2006.01)
*B32B 27/36* (2006.01)
*C09D 133/04* (2006.01)
*C09D 133/06* (2006.01)
*C09D 133/08* (2006.01)
(Continued)

(52) U.S. Cl.
CPC .. *C08J 7/047* (2013.01); *C08J 7/18* (2013.01); *B05D 3/06* (2013.01); *B05D 3/061* (2013.01); *B05D 3/062* (2013.01); *B05D 3/063* (2013.01); *B05D 3/065* (2013.01); *B05D 3/067* (2013.01); *B05D 3/10* (2013.01); *B05D 3/101* (2013.01); *B05D 3/14* (2013.01); *B05D 3/141* (2013.01); *B05D 3/144* (2013.01); *B05D 7/04* (2013.01); *B32B 7/02* (2013.01); *B32B 15/09* (2013.01); *B32B 27/30* (2013.01); *B32B 27/308* (2013.01); *B32B 27/36* (2013.01); *B32B 2255/10* (2013.01); *B32B 2255/26* (2013.01); *B32B 2307/584* (2013.01); *B32B 2311/00* (2013.01); *B32B 2367/00* (2013.01); *C08F 20/26* (2013.01); *C08F 20/58* (2013.01); *C08F 220/26* (2013.01); *C08F 220/58* (2013.01); *C08J 2367/00* (2013.01); *C08J 2433/00* (2013.01); *C08K 3/36* (2013.01); *C08K 5/0025* (2013.01); *C08K 5/04* (2013.01); *C08K 5/07* (2013.01); *C08K 5/132* (2013.01); *C08K 5/3492* (2013.01); *C08K 5/5313* (2013.01); *C08K 5/5397* (2013.01); *C08L 33/04* (2013.01); *C08L 33/062* (2013.01); *C08L 33/066* (2013.01); *C08L 33/08* (2013.01); *C08L 33/10* (2013.01); *C08L 33/14* (2013.01); *C08L 33/24* (2013.01); *C08L 33/26* (2013.01); *C09D 7/12* (2013.01); *C09D 7/125* (2013.01); *C09D 7/1233* (2013.01); *C09D 133/04* (2013.01); *C09D 133/06* (2013.01); *C09D 133/062* (2013.01); *C09D 133/066* (2013.01); *C09D 133/08* (2013.01); *C09D 133/10* (2013.01); *C09D 133/14* (2013.01); *C09D 133/24* (2013.01); *C09D 133/26* (2013.01); *C09D 151/08* (2013.01); *C09D 151/10* (2013.01); *Y10T 428/265* (2015.01); *Y10T 428/266* (2015.01); *Y10T 428/269* (2015.01); *Y10T 428/31565* (2015.04); *Y10T 428/31681* (2015.04); *Y10T 428/31786* (2015.04); *Y10T 428/31797* (2015.04)

(58) Field of Classification Search
None
See application file for complete search history.

(56) References Cited

U.S. PATENT DOCUMENTS 3,772,062 A * 11/1973 Shur et al. ............... 428/413
3,968,305 A *  7/1976 Oshima et al. ........... 428/334
(Continued)

FOREIGN PATENT DOCUMENTS

JP    2007-145965    *  6/2007
WO   WO 2007/043727  *  4/2007

OTHER PUBLICATIONS

"1,6-Hexanediol Diacrylate" (http://chemicalland21.com/industrialchem/functional%20Monomer/1,6-HEXANEDIOL%20DIACRYLATE.htm) webpage retrieved Nov. 25, 2014.*

*Primary Examiner* — Vivian Chen
(74) *Attorney, Agent, or Firm* — McAndrews Held & Malloy, Ltd.

(57) ABSTRACT

The invention relates to a polyester film comprising, on at least one of the faces thereof, a scratch-resistant crosslinked coating. The objective of the invention is to provide a polyester film coated with an abrasion-resistant layer which adheres perfectly to the polyester substrate, and is simple and economical to manufacture. To achieve this objective, the crosslinked hard coating applied to the polyester film comprises: i. 20% to 99% by weight of at least one ester and/or one amide of (meth)acrylic acid comprising a substituted protic group; ii. 20% to 99% by weight of acrylic resin(s); iii. 1% to 40% of a polyalkylene diacrylate; iv. 0 to 50% of at least one derivative of the benzophenone family; v. 0 to 5% of at least one photoinitiator. The invention also relates to the method for obtaining this polyester film coated with an abrasion-resistant hard layer. Use in the production of polyester/metal sheet (steel) colaminate.

24 Claims, No Drawings

(51) Int. Cl.

| | |
|---|---|
| *C09D 133/10* | (2006.01) |
| *C09D 133/14* | (2006.01) |
| *C09D 133/24* | (2006.01) |
| *C09D 133/26* | (2006.01) |
| *C09D 7/12* | (2006.01) |
| *B05D 3/06* | (2006.01) |
| *B05D 3/10* | (2006.01) |
| *B05D 3/14* | (2006.01) |
| *C08J 7/04* | (2006.01) |
| *C08J 7/18* | (2006.01) |
| *C08K 3/36* | (2006.01) |
| *C08K 5/04* | (2006.01) |
| *C08K 5/132* | (2006.01) |
| *C08K 5/07* | (2006.01) |
| *C08K 5/5313* | (2006.01) |
| *C08K 5/5397* | (2006.01) |
| *C08K 5/3492* | (2006.01) |
| *C08L 33/04* | (2006.01) |
| *C08L 33/08* | (2006.01) |
| *C08L 33/10* | (2006.01) |
| *C08L 33/14* | (2006.01) |
| *C08F 20/26* | (2006.01) |
| *C08F 20/58* | (2006.01) |
| *C08F 220/58* | (2006.01) |
| *C08F 220/26* | (2006.01) |
| *C08L 33/26* | (2006.01) |
| *C08L 33/06* | (2006.01) |
| *C08L 33/24* | (2006.01) |
| *C08K 5/00* | (2006.01) |
| *C09D 151/08* | (2006.01) |
| *C09D 151/10* | (2006.01) |
| *B05D 7/04* | (2006.01) |

(56) References Cited

U.S. PATENT DOCUMENTS

| | | | | |
|---|---|---|---|---|
| 3,989,740 | A * | 11/1976 | Broussard et al. | 560/224 |
| 3,992,276 | A * | 11/1976 | Powanda et al. | 522/14 |
| 4,065,624 | A * | 12/1977 | Prucnal et al. | 428/522 |
| 4,131,529 | A * | 12/1978 | Osterloh et al. | 522/10 |
| 4,251,341 | A * | 2/1981 | Felder et al. | 522/43 |
| 4,323,591 | A * | 4/1982 | Wendling et al. | 522/33 |
| 4,478,876 | A * | 10/1984 | Chung | 427/515 |
| 4,486,504 | A * | 12/1984 | Chung | 428/412 |
| 4,491,508 | A * | 1/1985 | Olson et al. | 522/44 |
| 4,525,258 | A * | 6/1985 | Watanabe et al. | 522/14 |
| 4,561,950 | A * | 12/1985 | Leo | 522/91 |
| 4,600,649 | A * | 7/1986 | Leo | 428/412 |
| 4,822,828 | A * | 4/1989 | Swofford | 522/84 |
| 5,075,348 | A * | 12/1991 | Revis et al. | 522/84 |
| 5,084,538 | A * | 1/1992 | Suzuki et al. | 526/261 |
| 5,104,929 | A * | 4/1992 | Bilkadi | 524/847 |
| 5,132,148 | A * | 7/1992 | Reafler | 427/393.5 |
| 5,258,225 | A * | 11/1993 | Katsamberis | 428/331 |
| 5,318,850 | A * | 6/1994 | Pickett et al. | 428/412 |
| 5,426,131 | A * | 6/1995 | Katsamberis | 522/16 |
| 5,468,789 | A * | 11/1995 | Lewis et al. | 524/99 |
| 5,547,750 | A * | 8/1996 | Rigamonti et al. | 428/329 |
| 5,565,501 | A * | 10/1996 | Hosokawa et al. | 522/83 |
| 5,633,079 | A * | 5/1997 | Shoshi et al. | 428/323 |
| 5,635,544 | A * | 6/1997 | Tamura et al. | 522/79 |
| 5,708,048 | A * | 1/1998 | Medford et al. | 522/64 |
| 5,712,325 | A * | 1/1998 | Lewis et al. | 522/83 |
| 5,811,472 | A * | 9/1998 | Patel | 522/14 |
| 5,817,715 | A * | 10/1998 | Medford | 524/789 |
| 5,910,356 | A * | 6/1999 | Ishikawa et al. | 428/215 |
| 5,914,162 | A * | 6/1999 | Bilkadi | 428/35.8 |
| 5,990,188 | A * | 11/1999 | Patel et al. | 522/28 |
| 6,191,884 | B1 * | 2/2001 | Takizawa et al. | 359/359 |
| 6,228,499 | B1 * | 5/2001 | Nakauchi et al. | 428/412 |
| 6,299,799 | B1 * | 10/2001 | Craig et al. | 252/500 |
| 6,348,537 | B2 * | 2/2002 | Sugamoto | 524/493 |
| 6,355,380 | B1 * | 3/2002 | Yun et al. | 429/309 |
| 6,355,703 | B1 * | 3/2002 | Baba et al. | 522/182 |
| 6,441,244 | B1 * | 8/2002 | Avar et al. | 568/327 |
| 6,562,440 | B1 * | 5/2003 | Tsuchiya et al. | 428/195.1 |
| 6,682,872 | B2 * | 1/2004 | Sachdev et al. | 430/311 |
| 6,777,102 | B2 * | 8/2004 | Sakurai et al. | 428/521 |
| 6,780,897 | B1 * | 8/2004 | Blum et al. | 522/110 |
| 6,872,789 | B2 * | 3/2005 | Brinkhuis et al. | 526/89 |
| 7,264,866 | B2 * | 9/2007 | Hashimoto et al. | 428/212 |
| 7,517,584 | B2 * | 4/2009 | Gust et al. | 428/336 |
| 7,547,735 | B1 * | 6/2009 | Konarski et al. | 522/6 |
| 7,645,502 | B2 * | 1/2010 | Mikami et al. | 428/143 |
| 7,671,109 | B2 * | 3/2010 | Cheng et al. | 523/210 |
| 7,935,392 | B2 * | 5/2011 | Hong et al. | 427/512 |
| 8,071,195 | B2 * | 12/2011 | Yoneyama et al. | 428/64.4 |
| 8,080,311 | B2 * | 12/2011 | Anderson | 428/215 |
| 8,110,278 | B2 * | 2/2012 | Hsu et al. | 428/143 |
| 8,114,920 | B2 * | 2/2012 | Kim et al. | 522/85 |
| 2002/0110692 | A1 * | 8/2002 | Suzuki et al. | 428/411.1 |
| 2003/0004221 | A1 * | 1/2003 | Sakurai et al. | 522/15 |
| 2004/0013892 | A1 * | 1/2004 | Yano et al. | 428/482 |
| 2005/0171231 | A1 * | 8/2005 | Diggins | 523/105 |
| 2007/0238804 | A1 * | 10/2007 | Ho et al. | 522/77 |
| 2009/0189303 | A1 * | 7/2009 | Diggins et al. | 264/1.38 |

* cited by examiner

ROLL-UP POLYESTER FILM COMPRISING, ON AT LEAST ONE OF THE FACES THEREOF, A SCRATCH-RESISTANT CROSS-LINKED COATING, METHOD FOR OBTAINING THIS POLYESTER FILM

FIELD OF THE INVENTION

The present invention relates to novel polyester films that can be rolled up on a reel and have a scratch-resistant coating and optionally other properties such as resistance to ageing caused by UV.

The field of the invention is that of polyester films, in particular the aromatic polyester films such as polyethylene terephthalate PET (e.g. with biaxial orientation) or polyethylene naphthalate (PEN), which are very widely used on account of their well-known excellent properties of thermal stability, dimensional stability, chemical resistance and relatively high surface energy as films for laminated sheet metals, films intended to be bonded on glass screen surfaces and protective films for a great variety of elements, for example films of (PET).

Films of polyester, in particular of PET, are widely used in particular in packaging and in industrial applications (e.g. electrical insulation, electronic components and protective films).

The Technical Problem and Prior Art

The colamination of polyester films on metal substrates or sheets is an application under development. Polyester film/metal (steel) sheet laminates are useful in particular for the protection of domestic electrical appliances, doors, decorative panels or white-boards or metal panels incorporated in construction elements (roof, window) of outdoor buildings or in means of transport: trains, boats or cars. In this application, the polyester film is useful as a film for protecting the metal against scratching. These properties of scuff resistance and scratch resistance correspond to surface hardness (or abrasion resistance).

In order to obtain these properties, it has been proposed to modify the structure of the polyester film itself and/or to produce a polyester film and one or more layers of polymer and/or apply a hard coating on at least one of the faces of the polyester film. This hard coating naturally improves the resistance to scratching or abrasion, but can also have an influence on adhesion, surface topology, gas permeability, printability and opacity.

The non-stick character of the polyester films is particularly desirable for outdoor applications, where it is desirable for the polyester films to have graffiti-resistant properties. Now, most of the polyester films provided with a hard coating and known to date achieve an improvement in abrasion resistance without reaching a sufficient level of anti-adherence to give rise to graffiti-resistant properties.

Moreover, these known polyester films coated with one or more hard layers also leave room for improvement with respect to some or all of the following technical characteristics:
- abrasion resistance and/or scuff resistance and/or scratch resistance (hardness),
- adhesion of the hard coating on the polyester substrate film, for example of PET,
- transparency and antireflective properties,
- development of anti-UV properties,
- possibility of producing the hard coating within the scope of the method for the manufacture of the polyester film before and/or after the polyester film has been oriented, positioned and cooled.

To illustrate the technology for the application of a hard coating on a polyester film, in particular a PET film, some patents will be cited below.

U.S. Pat. No. 4,310,600 describes a polyester film with biaxial orientation, previously subjected to a corona treatment, then coated firstly with a layer of thermosetting latex and secondly with a silicone layer obtained by cross-linking under UV.

U.S. Pat. No. 5,415,942 describes an abrasion-resistant polyester film coated on one of its faces with an adhesive film and on the other of its faces with a primary coating comprising a cross-linkable acrylic polymer on which an abrasion-resistant silicone layer is applied. The polyacrylic primary coating comprises for example 63% of methyl methacrylate, 32% of ethyl acrylate, 3% of methacrylic acid and 2% of 2-hydroxyethyl acrylate, the cross-linking agent being of the melamine-formaldehyde type. The abrasion-resistant silicone coating comprises 10 to 70% of silica, up to 20% of a polymerized epoxysilane and from 30 to 90 wt. % of a polymerized silanol bearing vinylphenylglycidoxypropyl or methacryloxypropyl functional groups.

EP-B-1 418 197 discloses a polyester film with biaxial orientation comprising an aromatic polyester film, which is coated with a coating layer formed from a mixture of polyester resin, acrylic resin and wax. The polyester resin is obtained by high-temperature polycondensation under reduced pressure, from an acid such as terephthalic acid, isophthalic acid, partially sulphonated phthalic acid, etc. and a polyol component of the ethylene glycol type, for example 1,4-butanediol-diethylene glycol, etc. The acrylic resin is an acrylic copolymer comprising 50 mol. % of methyl methacrylate, 40 mol. % of ethyl acrylate, 5 mol. % of N-methylolacrylamide and 5 mol. % of 2-hydroxyethyl methacrylate and obtained by polymerization using polymerization initiators (three hours at 60-70° C.). The wax is, for example, a carnauba wax or a paraffin. This layer can also contain inert silica particles.

WO-A-03/072643 describes a biaxially oriented polyester film that is printable and abrasion-resistant, said film being coated with a cross-linked melamine layer containing colloidal particles, for example of silica. It comprises melamine-formaldehyde resins cross-linkable by means of a catalyst based on phosphoric acid and optionally containing a silane.

WO-A-2006/069047 describes a polyester film on which a scratch-resistant coating is applied, obtained by means of a cross-linking system comprising a peroxide and a cross-linking agent based on melamine. The composition of thermally cross-linkable hard coating according to WO-A-2006/069047 contains a hexafunctional aliphatic urethane acrylate oligomer binder, a monomeric diluent of the 1,6-hexanediol diacrylate type, a peroxide thermal initiator of the 1,1-di(tertbutylperoxy)-3,3,5-trimethylcyclohexane type, a melamine cross-linking agent of the hexamethoxymethylmelamine type, a silane of the 3-glycidoxypropyltrimethoxysilane type and an adhesion promoter constituted by a substituted organosilane of the HF86 type and/or by a silane ester mixture of the PC850 type.

This type of coating is either too complicated to produce with several layers of products as in the case of U.S. Pat. No. 4,310,600 or it does not lead to sufficient hardness for protection of the fronts of domestic electrical appliances or in outdoor applications.

OBJECTIVES OF THE INVENTION

In this context, one of the essential objectives of the present invention is to provide a polyester film that can be rolled up in particular on a reel, comprising on at least one of its faces a cross-linked hard coating that is perfectly resistant to scratches i.e. to abrasion, said film being moreover economical, anti-adherent (graffiti-resistant properties), cohesive i.e. provided with a scratch-resistant coating that is perfectly integral with the polyester substrate, and optionally transparent and/or antireflective and/or anti-UV.

Another essential objective of the invention is to provide a roll-up polyester film, comprising on at least one of its faces, a cross-linked scratch-resistant hard coating, which can easily be produced industrially, in particular which can be integrated within the conventional process for the manufacture of polyester film before and/or after the polyester film has been oriented, positioned and cooled.

Another essential objective of the invention is to provide a roll-up polyester film, comprising on at least one of its faces, a cross-linked scratch-resistant hard coating, which would be an advantageous alternative to the known polyester films provided with a hard coating, and in particular contains neither melamine-based cross-linking agents, nor binders based on urethane, nor waxes.

Another essential objective of the present invention is to provide a polyester film, preferably of the roll-up type, comprising on at least one of its faces, a cross-linked scratch-resistant hard coating, said film being particularly suitable for making laminates with sheets of metal, for example of steel.

Another essential objective of the present invention is to provide a method for obtaining a roll-up polyester film, comprising on at least one of its faces, a cross-linked hard coating that is scratch-resistant, and satisfactory for the aforementioned objectives.

Another objective of the invention is to provide a method for obtaining a polyester film, preferably of the roll-up type, provided with a scratch-resistant cross-linked hard coating, said method being simple to implement and employing technologies for cross-linking by actinic activation, preferably under UV.

BRIEF DESCRIPTION OF THE INVENTION

These objectives, among others, are achieved by the present invention which relates, in a first aspect, to a polyester film, preferably of the roll-up type, comprising on at least one of its faces a coating cross-linked under actinic irradiation, which is scratch-resistant and is based on:
i. 20 to 99 wt. % of at least one ester and/or amide of (meth)acrylic acid with a substituted protic group, preferably at least one ester of (meth)acrylic acid and at least one aliphatic polyhydric alcohol with a substituted protic group, and, even more preferably, at least one ester of (meth)acrylic acid and at least one aliphatic polyhydric alcohol with a substituted protic group selected from the group comprising: 2-hydroxyethyl acrylate and methacrylate, 3-hydroxypropyl acrylate and methacrylate, 2-acryloyloxymethyl-2-hydroxymethyl propane, 2-methacryloyloxymethyl-2-hydroxymethyl propane, pentaerythritol mono, bis- and triacrylate, pentaerythritol mono-, bis-, and trimethacrylate, dipentaerythritol di-, tri-, tetra-, and penta-acrylate and methacrylate;
ii. 20 to 99 wt. % of acrylic resin(s);
iii. 1 to 40 wt. % of a polyalkylene diacrylate, preferably a hexamethylene diacrylate;
iv. 0 to 50 wt. % of at least one derivative of the benzophenone family;
v. 0 to 5 wt. % of at least one photoinitiator.

This polyester film, preferably of the roll-up type comprising, on at least one of its faces, an abrasion-resistant cross-linked hard coating, possesses good properties of hardness, and therefore of scratch resistance, good properties of cohesion between the film and the coating, and even optional characteristics of printability and/or of transparency and/or antireflective and/or anti-UV. It is economical and simple to produce.

In a second aspect, the invention satisfies the aforementioned objectives by providing a method for obtaining the film as defined above, said method therefore being characterized in that it consists essentially of:
a. employing a coating composition comprising the constituents (i) to (iii), optionally (iv) and/or (v), as defined above;
b. optionally diluting the coating composition by adding solvent to achieve a dry extract less than or equal to 50%, preferably less than or equal to 35%, and, even more preferably, less than or equal to 20%;
c. optionally previously treating the face(s) of the polyester film to be coated, preferably by UV irradiation or by corona or plasma treatment or by coating beforehand with formulations based on acrylic, polyester and/or polyurethane;
d. coating the face(s) of the polyester film to be coated with said coating composition;
e. then drying and irradiating by actinic route, preferably under UV, said coating composition applied by coating to obtain a cross-linked coating.

This method meets the industrial requirements of speed and ease of implementation.

In a third aspect, the invention relates to a polyester/metal sheet colaminate comprising at least one polyester film according to the invention and at least one metal sheet.

DETAILED DESCRIPTION OF THE INVENTION

In the meaning of the invention, the term "roll-up", which corresponds to a preferred embodiment, denotes that the polyester film can be rolled up easily, e.g. around a reel, and unwound, and this operation of unwinding does not require a significant force, i.e. there is no visual defect from the reel such as grooving, screw defects or sticking points due to "blocking" i.e. blocking due to lack of slip between the sheets of film. This "roll-up" character can be likened to good "machinability", which is difficult to quantify. A possible means for quantifying "machinability" by measuring the layer of air in a reel of film by interferometry is given in *Macromolecular Symposia,* 1999, 148, 311-319. Said measurement is difficult, however, and it is well known that the roughness of the film contributes in part to obtaining a layer of air suitable for good "machinability". Thus, it is considered that it is preferable that the average roughness (Ra) should be, for example, greater than or equal to 5 nm measured according to standard DIN 4768, to obtain a film that has good "machinability" and therefore to obtain a "roll-up" film.

The polyester film according to the invention is coated with a hard, abrasion-resistant cross-linked coating film, which has little if any effect on the intrinsic properties of the polyester film.

In order to do this, the invention is based at least partly on the novel, non-obvious selection of a hard cross-linked coating composition, based on the components (i) to (iii), optionally (iv) and/or (v).

Preferably, this hard cross-linked coating composition is free from cross-linking agent of the melamine type.

Preferably, this hard cross-linked coating composition is free from wax.

Preferably, this hard cross-linked coating composition is free from urethane binder.

Polyester Film

The polyester film or substrate on which the cross-linked hard coating is applied is preferably an aromatic polyester, even more preferably an essentially linear aromatic polyester, obtained from an aromatic dibasic acid or of an ester derived from said acid, and from a diol or from an ester derived from said diol.

Advantageously, the polyester film employed has biaxial orientation.

The polyester constituting the base film can be selected from the polyesters that are usually employed for obtaining bi-oriented semi-crystalline films. They are film-forming linear polyesters, crystallizable by orientation and obtained in the usual way from one or more aromatic dicarboxylic acids or their derivatives (esters of lower aliphatic alcohols or halides for example) and one or more aliphatic diols (glycols).

As examples of aromatic acids, the phthalic, terephthalic, isophthalic, naphthalene-2,5-dicarboxylic, naphthalene-2,6-dicarboxylic acids may be mentioned. These acids can be combined with a smaller quantity of one or more aliphatic or cycloaliphatic dicarboxylic acids, such as the adipic, azelaic, tetra- or hexahydroterephthalic acids.

As non-limitative examples of aliphatic diols, ethylene glycol, 1,3-propanediol, 1,4-butanediol may be mentioned. These diols can be combined with a smaller quantity of one or more aliphatic diols more condensed in carbon (neopentylglycol for example) or cycloaliphatic (cyclohexanedimethanol).

Preferably, the film-forming crystallizable polyesters are polyterephthalates or alkylenediol polynaphthalenedicarboxylates and, in particular, polyethylene glycol terephthalate (PET) or 1,4-butanediol or copolyesters having at least 80 mol. % of ethylene glycol terephthalate units. Advantageously, the polyester is a polyethylene glycol terephthalate whose intrinsic viscosity measured at 25° C. in ortho-chlorophenol is between 0.6 and 0.75 dl/g.

The bi-oriented polyester films are, for example:
either constituted by polyethylene terephthalate;
or constituted by mixtures, or not, of polyethylene terephthalate copolyesters containing cyclohexyl dimethylol units instead of the ethylene units (see U.S. Pat. No. 4,041,206 or EP-A-0408042);
or composed of mixtures, or not, of polyethylene terephthalate copolyesters with a polyester part with the isophthalate units (see patent EP-B-0515096);
or constituted by several layers of polyesters of different chemical natures, as described previously, obtained by coextrusion.

Specific examples of aromatic polyesters are in particular polyethylene terephthalate, polyethylene isophthalate, polybutylene terephthalate, poly-(dimethyl-1,4-cyclohexylene terephthalate) and polyethylene-2,6-naphthalenedicarboxylate. The aromatic polyester can be a copolymer of these polymers or a mixture of these polymers with a small quantity of other resins. Among these polyesters, polyethylene terephthalate (PET) and polyethylene-2,6-naphthalenedicarboxylate are particularly preferred as they offer a good balance between physical properties, mechanical properties and optical properties.

The polyester film provided with a cross-linked hard coating according to the invention can be laminated easily by thermal bonding and/or bonding with an adhesive to a very large number of other substrates, in particular including metal sheets, for example of steel, plates or sheets of glass or of other polymers similar to glass.

The polyesters, in particular the aromatic polyesters, can contain (at least on the surface) a filler appropriate to the requirements, for example to prevent it sticking to itself. These particulate fillers are advantageously included in the polyester in order to modify its surface properties.

As examples of fillers that are known lubricants for polyester film, calcium carbonate, calcium oxide, aluminium oxide, kaolin, silica, zinc oxide, carbon black, silicon carbide, tin oxide, particles of cross-linked acrylic resin, particles of cross-linked polystyrene resin, particles of cross-linked melanin resin, particles of cross-linked silicone resin or similar may be mentioned. Fillers of the silica and/or carbonate type are preferably used.

The filler particles described above can have an average diameter between 0.05 and 10 microns and are preferably present in a quantity between 0 and 20000 parts per million by weight relative to the total mass of the polyester (e.g. aromatic) and more particularly between 0.5 and 6 microns and are preferably present in a quantity between 200 and 1500 parts per million by weight relative to the total mass of the polyester (e.g. aromatic).

If a film of high transparency is desired, it is preferable to avoid massive incorporation of filler.

Moreover, if necessary, the polyester film can further comprise at least one other additive, preferably selected from the following group: dye, antistatic agent, antioxidant, organic lubricant, anti-UV additive, catalyst or any other similar additive.

According to an advantageous variant of the invention, the polyester film comprises at least one anti-UV additive incorporated preferably in the film or polyester substrate. This anti-UV additive can be selected from several groups of known products such as those described in the work "*Additives for plastics on book, John Murphy, 2$^{nd}$ Edition 2001, Elsevier Advanced Technology*" and more specifically for PET films such as those described in U.S. Pat. No. 6,593,406.

As examples of anti-UV additives, there may be mentioned:
the family of antioxidants or absorbers such as the benzophenones, the benzotriazoles, the benzoxazinones and the triazines;
the family of "Hindered amine light stabilizers" (HALS), alone or in combination with antioxidants.

The polyester film will preferably comprise at least one anti-UV additive, and even more preferably an anti-UV of the triazine type.

These anti-UV additives are used for countering the effects of UV and oxygen on the polyester films.

The aromatic polyester film can be obtained by melt extrusion, which produces an aromatic polyester film, which is then cooled and solidified on a forming drum to obtain an unstretched film. The unstretched film is then stretched at a temperature between the glass transition temperature Tg and a temperature equal to Tg+60° C. in the longitudinal direction, one or more times (for example from 3 to 6 times), then the film is stretched at a temperature between Tg and Tg+60° C. in the transverse direction with a stretching ratio of 3 to 5 times. The biaxially stretched film is then heat-treated at a temperature between 180 and 250° C. for 1 to 60 seconds for example and then at a lower temperature in order to stabilize the film.

The polyester film preferably has a thickness between 4 and 350 microns. The upper limit and the lower limit of film thickness ($e^f$) are even more preferably 8 microns and 50 microns respectively. When the film thickness is in this range, the film has a favourable mechanical strength, in particular with a view to the application of a cross-linked hard coating.

The polyester film can be of simple structure or coextruded AB, ABA or ABC or even of more complex multilayer structure (with the symbols A, B and C corresponding to layers with different nature and/or composition).

Scratch-Resistant Cross-Linked Coating

Coating Thickness

According to a preferred characteristic of the invention, the coating has a thickness (e'') less than or equal to 10 μm, preferably between 1 and 7 μm.

Composition of the Coating

-i- Ester and/or Amide of (meth)acrylic Acid with Substituted Protic Groups

These compounds represent 20 to 99 wt. % relative to the total weight of the coating composition.

These compounds, and in particular the esters of polyhydric alcohol, as well as the methods for manufacturing said compounds are well known by a person skilled in the art. For example, a method of production of a substituted hydroxy mono-, di- or tri-acrylate ester consists of reacting the acrylic acid in excess with a di-, tri- or tetra-hydroxylated compound. Consequently, acrylic acid can for example be reacted with pentaerythritol to produce a mixture of di-, tri- and tetra-acrylic esters, and from this mixture it is possible to extract, in a manner that is selective and known per se, the ester compounds that are most suitable for the invention, for example pentaerythritol triacrylate.

-ii- Acrylic Resin

This acrylic resin represents 20 to 99 wt. % relative to the total weight of the coating composition and is preferably selected from those that are soluble in water or in an aqueous medium containing small amounts of organic solvent.

The acrylic resin can be obtained by polymerization, preferably by copolymerization of silica, silane acrylate as coupling agent and one or more of the following acrylic monomers (non-limitative list):

alkyl acrylate and alkyl methacrylate in which the alkyl group is a methyl, ethyl, n-propyl, isopropyl, n-butyl, isobutyl, t-butyl, 2-ethylhexyl, cyclohexyl or similar group;

hydroxylated monomers such as 2-hydroxyethyl acrylate, 2-hydroxyethyl methacrylate, 2-hydroxypropyl acrylate and 2-hydroxypropyl methacrylate;

epoxidized monomers such as glycidyl acrylates; glycidyl methacrylate and allylglycidyl ether;

monomers comprising a carboxyl group or a carboxylate salt such as acrylic acid and methacrylic acid, itaconic acid, succinic acid, maleic acid, fumaric acid, crotonic acid, styrenesulphonic acid and salts thereof (such as sodium salt, potassium salt, ammonium salt and tertiary amine salts);

monomers containing amide groups such as acrylamide, methacrylamide, N-alkylacrylamide, N-alkylmethacrylamide, N,N-dialkylacrylamide, N,N-dialkylmethacrylamide (in which the alkyl group is a methyl group, an ethyl group, a propyl group, an isopropyl group, an N-butyl group, an isobutyl group, a t-butyl group, a 2-ethylhexyl group, a cyclohexyl group or similar), N-alkoxyacrylamide, N-alkoxymethacrylamide, N,N-dialkoxyacrylamide, N,N-dialkoxymethacrylamide (in which the alkoxy group is a methoxy, ethoxy, butoxy, isobutoxy group or similar); acryloyl, morpholine, N-methylolacrylamide, N-methylolmethacrylamide, N-phenylacrylamide and N-phenylmethacrylamide;

monomers containing oxazoline groups such as 2-vinyl-2-oxazoline, 2-vinyl-4-methyl-2-oxazoline, 2-vinyl-5-methyl-2-oxazoline, 2-isopropenyl-2-oxalonine, 2-isopropenyl-4-methyl-2-oxazoline and 2-isopropenyl-5-methyl-2-oxazoline;

and monomers comprising a polyoxyalkylene chain resulting from the addition of a polyoxyalkylene to a carboxyl group of an acrylic acid or a methacrylic acid.

As other copolymerizable compounds, there may be mentioned anhydrides, monomers of acid anhydrides such as maleic anhydride and itaconic anhydride and monomers such as vinyl isocyanate, allyl isocyanate, styrene, alpha-methylstyrene, vinylmethyl ether, vinylethyl ether, vinyltrialkoxysilane, mono ester of alkyl maleic acids, monoester of alkyl maleic acid, monoester of alkyl fumaric acid, monoester of alkylitaconic acid, acrylonitrile, methacrylonitrile, vinyl chloride, ethylene, propylene, vinylidene chloride, vinyl acetate and butadiene can be used.

Preferably, the acrylic or methacrylic resin is composed of a monomer of the methyl, ethyl or butyl acrylate or methacrylate type. Other vinyl monomers can be copolymerized with the esters of acrylic acids or methacrylic acids. They may be for example aromatic vinylic compounds and vinylic compounds bearing cyano groups.

-iii- Polyalkylene Diacrylate

The polyalkylene diacrylate represents 1 to 40 wt. % relative to the total weight of the coating composition.

Hexamethylene diacrylate is a preferred example of this compound iii polyalkylene diacrylate. As other examples of component iii, there may be mentioned, among others, butylene diacrylate, octyl diacrylate.

-iv- Derivatives of the Benzophenone Family

The derivatives of the benzophenone family, such as resorcinol are present in the coating composition at a rate of 0 to 50 wt. % relative to the total weight of the coating composition.

Preferably, the derivatives of the benzophenone family are derivatives of resorcinol on which at least one alkoxysilyl group is grafted via a spacer (linking hinge), for example an alkylene unit. These resorcinol derivatives can be obtained by grafting at least one alkoxysilyl function on the benzene nucleus of the resorcinol via a precursor bearing an acrylic or alkenyl reactive function. The other three substituted carbons of the benzene nucleus of the resorcinol can be substituted with aromatic groups, for example benzoyl groups in order to generate Norrish type cleavage during actinic activation.

Among the derivatives of resorcinol, 4,6-dihydroxy-5-[3-(triethoxysilyl)propyl]-1,3-phenylene]bis[phenylmethanone] will be preferred.

-v- Photoinitiator

At least one photoinitiator is present in the coating composition at a rate of 0 to 5 wt. % relative to the total weight of said coating composition.

In a preferred embodiment of the invention, the composition comprises between 0.01 and 2 wt. % of photoinitiator and more preferably a quantity of the order of 1 wt. %.

Preferably, the photoinitiator is selected from the following products: products of the benzophenone family different from the derivatives iv of the benzophenone family as described above used by themselves or mixed together, products of the family of the alpha-hydroxyketones used by themselves or mixed together, products of the family of the phenyl glyoxals used by themselves or mixed together, products formed by a mixture of bis-acyl phosphine and alpha-hydroxyketone compounds and mixtures thereof.

The photoinitiators of the family of the alpha-hydroxyketones correspond to the commercial products IRGACURE® 184 and DAROCUR® 1173.

The photoinitiators of the family of the phenyl glyoxals correspond to the commercial products IRGACURE® 754.

A mixture of bis acid phosphine and alpha-hydroxyketone compounds is marketed under the name IRGACURE® 2022.

It should be noted that these derivatives (v) can advantageously (but not limitatively) be used as photoinitiators, supplementing or replacing the derivatives of the benzophenone family (iv).

The cross-linked coating of the polyester film according to the invention is preferably obtained by cross-linking under actinic irradiation. The aforementioned photoinitiators correspond to actinic irradiation under UV.

There are other types of activation by actinic irradiation that can be replaced or combined with UV radiation, for example electromagnetic radiation in the near infrared, in the visible region or X-rays. Particle radiation such as electron bombardment is another type of activation by actinic irradiation. Activation of cross-linking of the coating by actinic irradiation can optionally be combined with thermal activation.

The cross-linked hard coating of the polyester film according to the invention can contain other additives, for example fillers, anti-UV additives either for absorbing UV or to prevent ageing of the film. These fillers and these anti-UV additives can for example be selected from those mentioned above, as possible constituents of the polyester substrate.

Method for Obtaining the Film

According to its third aspect, the invention relates to a method in particular for obtaining the film as defined above. This method comprises essentially stages a, b, c, d and e described below.

Stage a:

The coating composition from i) to iii) and optionally (iv) and/or (v) leading to the cross-linked hard coating comprises for example:
i) pentaerythritol triacrylate
ii) acrylic resin resulting from grafting a silane acrylate on a silica
iii) hexamethylene diacrylate
iv) 4,6-dihydroxy-5-[3-(triethoxysilyl)propyl]-1,3-phenylene]bis[phenylmethanone], which can be grafted on silica.

These compounds are for example in solution in alcoholic solvents such as 1-methoxy-2-propanol alone or mixed with 2-methoxy-1-propanol.

The corresponding products are for example those marketed by the company MOMENTIVE PERFORMANCE MATERIALS.

Stage b:

According to the invention, it is advantageous to dilute the coating composition to obtain a dry extract less than or equal to 50%, preferably less than or equal to 35 wt. %, and more preferably less than or equal to 20%.

Judiciously selected, this dry extract makes it possible to obtain thin coating layers on the polyester substrate film, enabling the reduced thickness desired for the cross-linked coating to be achieved more easily.

Stage c:

This stage consists of a treatment that aims to improve the adherence, according to which the face or faces of the film to be coated with the hard coating are subjected to UV irradiation, to a corona treatment or to a plasma treatment or according to which it is coated beforehand with formulations based on acrylic, polyester and/or polyurethane.

Said physical treatments are carried out in a manner known per se by a person skilled in the art. As an illustration, reference may be made for example to the document in Food Science and Nutrition, 1999, 39(5), pages 457-477.

Stage d:

The liquid composition intended to form the cross-linked coating on the polyester film is applied by any appropriate method that is known per se, for example Meyer bar coating, coating by smooth or gravure roll, flexo coating, offset coating, curtain coating among others.

Preferably, this coating stage is carried out after the operations of biaxial stretching of the polyester film, for example PET.

According to a variant, this coating can be carried out between the first and the second stretching.

Ideally, the liquid coating composition has a viscosity between 10 and 5000 mPa·s in the case of coating by helio roll for example as described by persons skilled in the art (see presentation by G. L. Booth, $15^{th}$ Annual IGC European Coating System Conferences, 1990, Amsterdam).

Stage e: Drying and Actinic Irradiation

Drying of the liquid cross-linking composition coated on the polyester film is preferably carried out with hot air (for example 50 to 100° C.) directed onto the liquid composition coated on the polyester film for a few minutes. Actinic irradiation is carried out in a manner known per se and preferably using UV lamps, in such a way that the energy supplied is between 0.1 and 2 joules/cm$^2$ for an irradiance of 0.1 to 3 watts per cm$^2$ of coated cross-linkable composition, preferably between 0.1 and 1 watt per cm$^2$ of coated cross-linkable composition.

Moreover, the film speed (in m/min) is an important criterion. In order to optimize industrial production, a balance must be found between the energy supplied, the irradiance and the film speed.

For characterization of the properties of the polyester film with cross-linked hard coating according to the invention, the hardness and the cohesion are measured according to the usual test methods.

For further details about obtaining polyester films with cross-linked hard coating, reference may be made for example to European patent application EP-A-0 604 075.

According to a preferred characteristic of the invention, the polyester film is combined with at least one supplementary layer, preferably at least one sealing layer and/or printable coating layer and/or layer of adhesive. The polyester film can be of simple structure or coextruded AB, ABA or ABC, or even of more complex structure such as multilayers.

According to another advantageous embodiment of the invention, the film as defined above is obtained by previous treatment, either physical (preferably UV, corona or plasma) of the face or faces of the film intended to receive the coating, or chemical by coating with formulations based on acrylic, polyester and/or polyurethane.

This prior treatment aims to promote adhesion of the cross-linked coating on the polyester film.

The polyester film coated with a hard layer according to the invention is particularly suitable for lamination with substrates such as metal sheets, for example of steel, or even sheets or films of plastic, or glass plates or similar.

The polyester film according to the invention colaminated with a metal sheet, for example of steel, thus offers protection to the steel sheet, so that it has good to excellent scratch resistance, which is particularly advantageous in indoor applications such as protection of domestic electrical appliances, doors, decorative panels or white-boards or in applications in the open air for protecting metal panels forming elements of construction (roof, window) or present in means of transport such as trains, boats or cars.

Thus, the invention also relates, in a third aspect, to a polyester/metal sheet colaminate (for example of steel) comprising at least one polyester film as defined above and at least one metal sheet (for example of steel).

The invention will be better understood and its advantages will become apparent from the examples given below.

EXAMPLES

Several types of films were coated with a commercial "hard coat" hard coating UVHC 7000, UVHC 3000 or UVHC 8600 without solvent, all products from the company MOMENTIVE.

The composition of UVHC 7000 and of UVHC 3000 is given in Table 1 below. The two products differ in the use of anti-UV in UVHC 3000 for extra protection of the film beneath the "hard coat" coating. For UVHC 8600, it is a formulation without solvent 1-methoxy-2-propanol and without anti-UV.

TABLE 1

| | Concentration (%) |
|---|---|
| 1-methoxy-2-propanol | 50-100 |
| 2-methoxy-1-propanol | 0-0.5 |
| Pentaerythritol triacrylate | 10-20 |
| Acrylic resin | 10-20 |
| Hexamethylene diacrylate | 1-10 |
| Resorcinol derivatives: 4,6-dihydroxy-5-[3-(triethoxysilyl)propyl]-1,3-phenylene]bis[phenylmethanone] | 0-10 |

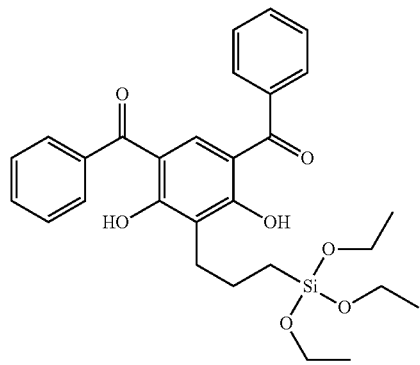 [SMILES: CCO[Si](CCCc1c(O)c(C(=O)c2ccccc2)cc(C(=O)c2ccccc2)c1O)(OCC)OCC]

| | |
|---|---|
| Anti-UV additives | 0-10 |

The photoinitiators given as an example are marketed in particular by the company Ciba. They are the products IRGACURE® 754, IRGACURE® 184, IRGACURE® 2022.

Film A=a film of 36 μm comprising a single layer of PET with silica fillers such that the film reaches a Haze according to standard ASTM D 1003 of 1.04%, and roughness defined by DIN 4768 with Ra of 7.7 nm.

Film B=a film of 15 μm with 2 layers, one of PET with silica fillers, on which the coating will be applied, and the other corresponding to a mixture of PET, copolyester with dimethylcyclohexyl and ethylene groups and silica fillers, which ensures sealing on metal for example or some other surface. This film is defined by a Haze according to standard ASTM D 1003 of 3.7%, and roughness defined by standard DIN 4768 with Ra of 44.3 nm.

Film C=a film of 20 μm with 2 layers, one of PET with silica fillers with added anti-UV of the triazine type (TINUVIN® 1577 from Ciba) on which the coating will be applied and the other layer corresponding to a mixture of PET, copolyester with dimethylcyclohexyl units, with additive of the HALS type and silica fillers which provide sealing on metal for example or some other surface. The constituents of the film make it possible to obtain a Haze according to standard ASTM D 1003 of 4.1%, roughness defined by DIN 4768 with Ra of 17.6 nm and with transmission of 13% at 380 nm (versus 83% transmission at 380 nm for a PET without anti-UV).

Film D=a film of 36 μm comprising a single layer of PET with silica fillers and added anti-UV of the triazine type (TINUVIN® 1577 from Ciba). The constituents of the film make it possible to obtain a Haze according to standard ASTM D 1003 of 1.4%, roughness defined by DIN 4768 with Ra of 10.0 nm and with transmission of 43% at 380 nm (versus 83% for a PET without anti-UV).

Irradiance and energy are measured with a UV Power Puck® EIT.

The adhesion test is carried out according to standard EN ISO 2409. The adhesive used is of the TESA 4651 type (width 25 mm, force 10 N).

Scratch tests are performed by a Taber test (ASTM D 1044: "resistance of transparent plastic materials to surface abrasion") with a model of the Abraser type, loaded with weights of 500 g of the CS10F type and a number of rotation cycles of 100 rather than 500 as specified by the standard. Measurements of Haze before and after the Taber test are carried out to evaluate the visual appearance of the samples according to standard ASTM D 1003 with equipment of the Gardner type.

The test evaluations will be based on the criteria:
In Adhesion
◉ between 0 very good and 2, ○ between 3 and 4, x corresponding to 5
Scratch Resistance
◉ for a Haze delta before and after the Taber test less than or equal to 4%, ○ greater than 4% and less than or equal to 9%, x greater than 9%

Examples 1-3

The formulation UVHC 3000 is diluted or not, depending on the desired coating thickness, by adding solvent of the 1-methoxy-2-propanol type. A film B is treated beforehand with UV irradiation, or not, then coated using a Meyer bar on a semi-automatic machine, then dried at 60° C. and irradiated under UV with mercury and gallium lamps. A layer of a certain thickness is obtained for a measured energy and irradiance. The test with adhesive tape indicates the level of adhesion, then tests for scratch resistance are carried out.

TABLE 2

| Examples | Pretreatment UV | Dry extract (%) | energy (J/cm$^2$) | irradiance (W/cm$^2$) | Coating thickness (μm) | Ra (nm) |
|---|---|---|---|---|---|---|
| Example 1 | yes | 16 | 1.5 | 0.4 | 1.7 | 166 |
| Example 2 | no | 45 | 1.2 | 0.4 | 7 | Not measurable |
| Example 3 | yes | 32 | 1.2 | 0.6 | 4 | 14 |

The following results are obtained:

TABLE 3

| Examples | Haze of the film | Adhesion | Scratch resistance |
|---|---|---|---|
| Bare film | 3.2% | | X |
| Example 1 | 3.1% | ◉ | ◉ |
| Example 2 | 4.6% | X | ○ |
| Example 3 | 5.1% | ○ | ○ |

Examples 4-6

The formulation of the "hard coat" coating is diluted by adding solvent of the 1-methoxy-2-propanol type. On a small laboratory pilot set-up permitting unwinding of a reel of film, a film B without corona treatment is coated using a helio roll with a layer of 2 μm of the formulation of diluted "hard coat" coating at a speed of 0.5 m/min then dried under hot air for 5 minutes at a maximum of 70° C. A sample from this reel is irradiated under a UV lamp from Fusion without air control. The hardness 5 H corresponds to our required hardness target.

TABLE 4

| Examples | Type of formulation | Dry extract (%) | UV lamp used | energy (J/cm$^2$) | irradiance (W/cm$^2$) | Coating thickness (μm) | Pencil hardness |
|---|---|---|---|---|---|---|---|
| Example 4 | UVHC 7000 | 22 | Type H | 0.4 | 0.5 | 2 | 5 H |
| Example 5 | UVHC 3000 | 32 | Type H | 1.2 | 1.2 | 2 | 5 H |
| Example 6 | UVHC 3000 | 32 | Type D | 1.7 | 2.7 | 2 | 5 H |

Examples 7-10

Screening of photoinitiators is carried out on a glass plate for a thickness of 2 μm and with monitoring of the hardness, which must reach 5H according to the energy required with a lamp of type H.

TABLE 5

| | "Hard coat" coating tested, undiluted | Photoinitiator tested | Amount added relative to the dry "hard coat" coating | Results found for UV energy (J/cm$^2$) to achieve 5 H |
|---|---|---|---|---|
| Comparative example 7 | UVHC 7000 | none | — | >2 |
| Example 8 | UVHC 7000 | IRGACURE ® 754 | 1% | 1 |
| Example 9 | UVHC 7000 | IRGACURE ® 184 | 1% | 0.50 |
| Example 10 | UVHC 7000 | IRGACURE ® 2022 | 1% | 0.25 |

Examples 11-14

IRGACURE® 2022 photoinitiator is added to the formulation UVHC 7000 or 3000 at a rate of 1% based on dry matter, then the formulation is diluted by adding solvent of the 1-methoxy-2-propanol type. On a small laboratory pilot set-up permitting unwinding of a reel of film, a corona-treated film B is coated using a helio roll with a layer of 2 μm of the UVHC formulation at a speed shown in Table 6 and then dried under hot air for 5 minutes at a maximum of 70° C. A sample from this reel is irradiated under a lamp of type H from Fusion UV without air control. The results are obtained in terms of pencil hardness.

Examples 11 and 14 give very satisfactory results as the amount of energy required is low for producing a film at an ideal speed in industrial production, and moreover the addition of the photoinitiator provides good cross-linking with very satisfactory hardness.

The pencil hardness was validated relative to the Taber test and very good scratch resistance (⊚) is indeed found for Examples 11 and 14.

Examples 15-19

Formulation UVHC 7000 is diluted from 30 to 22% of dry extract by adding solvent of the 1-methoxy-2-propanol type. On a pilot set-up permitting unwinding of a reel of film, a corona-treated film B is coated using a helio roll with a layer of 2 μm of diluted formulation UVHC 7000 at the speed shown in Table 7 and then dried under hot air over 2 m at a maximum of 70° C. Cross-linking is then carried out in line under irradiation with 2 bulbs H of 240 W/cm$^2$ adjusted to different percentages and without air control. A hardness of 5H is obtained for an energy of 0.26 J/cm$^2$.

TABLE 6

| Examples | "Hard coat" coating | Dry extract (%) | Photo-initiator | Film speed (m/min) | energy (J/cm$^2$) | irradiance (W/cm$^2$) | Pencil hardness |
|---|---|---|---|---|---|---|---|
| 11 | UVHC 7000 | 22 | 1% IRGACURE ® 2022 | 0.5 | 0.66 | 0.11 | 6 H |
| 12 | UVHC7000 | 22 | — | 0.5 | 1.54 | 0.11 | 5 H |
| 13 | UVHC3000 | 32 | — | 0.5 | 1.70 | 0.13 | 5 H |
| 14 | UVHC7000 | 22 | 1% IRGACURE ® 2022 | 1 | 0.26 | 0.10 | 6 H |

TABLE 7

| Examples | Dry extract (%) | Photo-initiator IRGACURE ® 2022 | Pretreatment of the film | Film speed (m/min) | irradiance % of the lamp | Pencil hardness |
|---|---|---|---|---|---|---|
| 15 | 22 | — | corona | 10 | 35 | 5 H |
| 16 | 22 | — | corona | 30 | 80 | 5 H |
| 17 | 22 | 1% | corona | 30 | 35 | 5 H |
| 18 | 32 | 1% | corona | 30 | 80 | 6 H Delta Haze after the Taber test = 1% |
| 19 | 22 | 1% | corona | 90 | 80 | 5 H |

Examples 20-22

Formulation UVHC 3000 is diluted by adding solvent of the 1-methoxy-2-propanol type. On a small laboratory pilot set-up permitting unwinding of a reel of film, a film B without corona treatment is coated using a helio roll with a layer of 2 μm of the diluted formulation UVHC 3000 at a speed of 0.5 m/min then dried under hot air for 5 minutes at a maximum of 70° C. A sample from this reel is irradiated under a lamp of type H of higher power from Fusion UV (240 W/cm$^2$) under a controlled atmosphere. The hardness and energy of the coated film are measured.

TABLE 8

| Examples | "Hard coat" coating | Dry extract (%) | Air control | energy (J/cm$^2$) | Pencil hardness |
|---|---|---|---|---|---|
| 20 | UVHC 3000 | 32 | air | 1.7 | 5 H |
| 21 | UVHC 3000 | 32 | 5000 ppm O$_2$ | 0.25 | 5 H |
| 22 | UVHC 3000 | 32 | 1000 ppm O$_2$ | 0.2 | 6 H |

Examples 23-24

IRGACURE® 2022 photoinitiator is added to formulation UVHC 7000 or 3000 at a rate of 1% with respect to the dry matter and then the formulation is diluted by adding solvent of the 1-methoxy-2-propanol type. On a small laboratory pilot set-up permitting unwinding of a reel of film, a different type of corona-treated film is coated using a helio roll with a layer of 2 μm of the UVHC formulation at 0.5 m/min and then dried under hot air for 5 minutes at a maximum of 70° C. A sample from this reel is irradiated under a lamp of type H from Fusion UV without air control. The results are obtained in terms of pencil hardness.

TABLE 9

| Examples | Type of film | "Hard coat" coating | Dry extract (%) | Photo-initiator | energy (J/cm$^2$) | irradiance (W/cm$^2$) | Pencil hardness |
|---|---|---|---|---|---|---|---|
| 23 | A | UVHC 7000 | 22 | 1% IRGACURE ® 2022 | 0.66 | 0.11 | 6 H |
| 24 | C | UVHC 7000 | 22 | 1% IRGACURE ® 2022 | 0.66 | 0.11 | 6 H |

Examples 25-27

IRGACURE® 2022 photoinitiator is added to formulation UVHC 8600 at a rate of 1%. On a pilot set-up, a different type of corona-treated film is coated using a helio roll with a layer of 3 μm of the UVHC formulation at 30 m/min and then dried under air for 5 minutes at a maximum of 40° C. A sample from this reel is irradiated under 2 lamps of 240 W/cm$^2$ and at 90% of the energy of 5 J/cm$^2$ without air control. The results are obtained in terms of Delta Haze after the Taber test.

TABLE 10

| Examples | Type of PET film | Coating grammage (g/m$^2$) | Delta Haze as percentage after the Taber test |
|---|---|---|---|
| 25 | A | 3.0 | 7 |
| 26 | B | 2.3 | 9 |
| 27 | D | 2.2 | 7 |

The invention claimed is:

1. A roll-up type polyester film comprising on at least one of its faces a coating that is cross-linked under U.V. irradiation in line, as the film is moving at a speed of 0.5-90 m/min of an industrial production, the coating being scratch-resistant and based on:
    i. 20 to 99 wt. % of at least one ester and/or amide of (meth)acrylic acid with a substituted protic group;
    ii. 20 to 99 wt. % of acrylic resin(s) obtained by copolymerization of silica, silane acrylate as a coupling agent, and one or more acrylic monomers;
    iii. 1 to 40 wt. % of a polyalkylene diacrylate;
    iv. 0 to 50 wt. % of at least one derivative of the benzophenone family; and
    v. 0.01% to 5 wt. % of at least one photoinitiator.

2. The film according to claim 1, comprising the photoinitiator at between 0.01 and 2 wt. % relative to the total weight of coating.

3. The film according to claim 1, having a thickness ($e^f$) between 4 and 350 μm.

4. The film according to claim 3, wherein the film thickness ($e^f$) is between 8 and 50 μm.

5. The film according to claim 1, wherein the coating has a thickness ($e^f$) less than or equal to 10 μm.

6. The film according to claim 5, wherein the coating thickness (e') is between 1 and 7 μm.

7. The film according to claim 1, wherein the photoinitiator (v) is selected from the group consisting of:
- products of the benzophenone family different from the derivatives (iv) of the benzophenone family as defined in claim 1 used alone;
- mixtures of products of the benzophenone family different from the derivatives (iv) of the benzophenone family as defined in claim 1;
- alpha-hydroxyketones used alone;
- mixtures of alpha-hydroxyketones;
- products of the family of the phenyl glyoxals used alone;
- mixtures of products of the family of the phenyl glyoxals;
- products formed by mixing bis-acyl phosphine and alpha-hydroxyketone compounds;
- and mixtures of products formed by mixing bis-acyl phosphine and alpha-hydroxyketone compounds.

8. The film according to claim 1, obtained by prior treatment selected from the group consisting of physical treatment of the face or faces of the film intended to receive the coating and chemical treatment by coating beforehand with formulations based on acrylic, polyester and/or polyurethane.

9. The film according to claim 1, containing fillers at least on the surface.

10. The film according to claim 1, the film comprising at least one supplementary layer.

11. The film according to claim 10, wherein the at least one supplementary layer is selected from the group consisting of a thermosealant layer, a printable layer and an adhesive layer.

12. The film according to claim 1, further comprising at least one other additive selected from the group consisting of dye, antistatic agent, antioxidant, organic lubricant, anti-UV additive, and catalyst.

13. The film according to claim 12, wherein the additive comprises at least one anti-UV additive of the triazine type.

14. A method for obtaining the film as defined in claim 1, which consists essentially of:
a. employing a coating composition comprising the constituents (i) to (iii) and (v), or a coating composition comprising the constituents (i) to (v), as defined in claim 1;
b. optionally diluting the coating composition by adding solvent to achieve a diluted coating composition selected from the group consisting of less than or equal to 50% of dry extract, less than or equal to 35% of dry extract, and less than or equal to 20% of dry extract;
c. optionally pretreating the face(s) of the polyester film to be coated, the pretreating being selected from the group consisting of UV irradiation, corona treatment, plasma treatment, and coating with formulations based on acrylic, polyester and/or polyurethane;
d. coating the face(s) of the polyester film to be coated with said coating composition;
e. drying and irradiating by actinic route said coating composition on the face(s) of the film to obtain a cross-linked coating.

15. A polyester/metal (steel) sheet colaminate, comprising:
- at least one polyester film selected from the group consisting of a polyester film according to claim 1 and a polyester film obtained by the method according to claim 14; and
- at least one metal sheet.

16. The method according to claim 14, wherein the irradiating by actinic route comprises UV irradiating.

17. The method according to claim 14, wherein the coating, drying, and irradiating are carried out in line.

18. The method according to claim 14, wherein the drying is accomplished at a temperature between 50° C. and 100° C.

19. The method according to claim 18, wherein the polyester film is a polyethylene terephthalate (PET) film and the drying is accomplished at a maximum heating temperature of 70° C.

20. The film according to claim 1, wherein the at least one ester and/or amide of (meth)acrylic acid with a substituted protic group comprises at least one ester of (meth)acrylic acid and of at least one aliphatic polyhydric alcohol with a substituted protic group.

21. The film according to claim 20, wherein the at least one ester of (meth)acrylic acid and of at least one aliphatic polyhydric alcohol with a substituted protic group is selected from the group consisting of 2-hydroxyethyl acrylate, 2-hydroxyethyl methacrylate, 3-hydroxypropyl acrylate, 3-hydroxypropyl methacrylate, 2-acryloyloxymethyl-2-hydroxymethyl propane, 2-methacryloyloxymethyl-2-hydroxymethyl propane, pentaerythritol mono, bis- or triacrylate, pentaerythritol mono-, bis-, or trimethacrylate, and dipentaerythritol di-, tri-, tetra-, or penta-acrylate.

22. The film according to claim 1, wherein the polyalkylene diacrylate is a hexamethylene diacrylate.

23. The film according to claim 1, wherein the photoinitiator is about 1 wt. % relative to the total weight of coating.

24. The film according to claim 1, wherein the acrylic resin(s) of (ii) are obtained by copolymerization that further comprises one or more vinyl monomers.

* * * * *